Oct. 3, 1961  W. R. BECK ET AL  3,002,763
WHEEL MOUNTING FOR SHUTTLE CARS AND THE LIKE
Filed Dec. 29, 1959

INVENTORS
William R. Beck
William G. Bunchak
BY

United States Patent Office
3,002,763
Patented Oct. 3, 1961

3,002,763
WHEEL MOUNTING FOR SHUTTLE CARS AND THE LIKE
William R. Beck, Palos Heights, and William G. Bunchak, Chicago, Ill., assignors to Goodman Manufacturing Company, Chicago, Ill., a corporation of Illinois
Filed Dec. 29, 1959, Ser. No. 862,600
4 Claims. (Cl. 280—96.1)

This invention relates to improvements in shuttle cars and more particularly relates to an improved wheel mounting for the wheels of a shuttle car and the like.

A principal object of the invention is to provide a wheel mounting for the steering and drive wheels of a shuttle car and the like, so arranged as to reduce breakage and damage of the mounting bolts for the bracket members for mounting the drive and steering wheels for the car.

Another object of the invention is to provide an improved wheel mounting for shuttle cars and the like, in which the connecting bolts for the wheel mounting brackets are relieved from shear.

Still another object of the invention is to provide a wheel mounting particularly adapted for the steering and drive wheels for shuttle cars, in which the shearing loads are taken from the mounting bolts by tongue and groove supporting connections between the mounting bracket members and the support members therefor, having at least one tapered face to take up clearance between the tongue and groove connection, and in which any tendency of the wheel mounting bracket to tilt about the tongue and groove connection, is counteracted by spacing means filling up any space between the support member and wheel mounting bracket member that may remain after clearance between the tongue and groove connection has been taken up, and by bolting the support member and wheel mounting bracket together in abutting engagement with the spacer means.

These and other objects of the invention will appear from time to time as the following specification proceeds and with reference to the accompanying drawing wherein.

Figure 1:
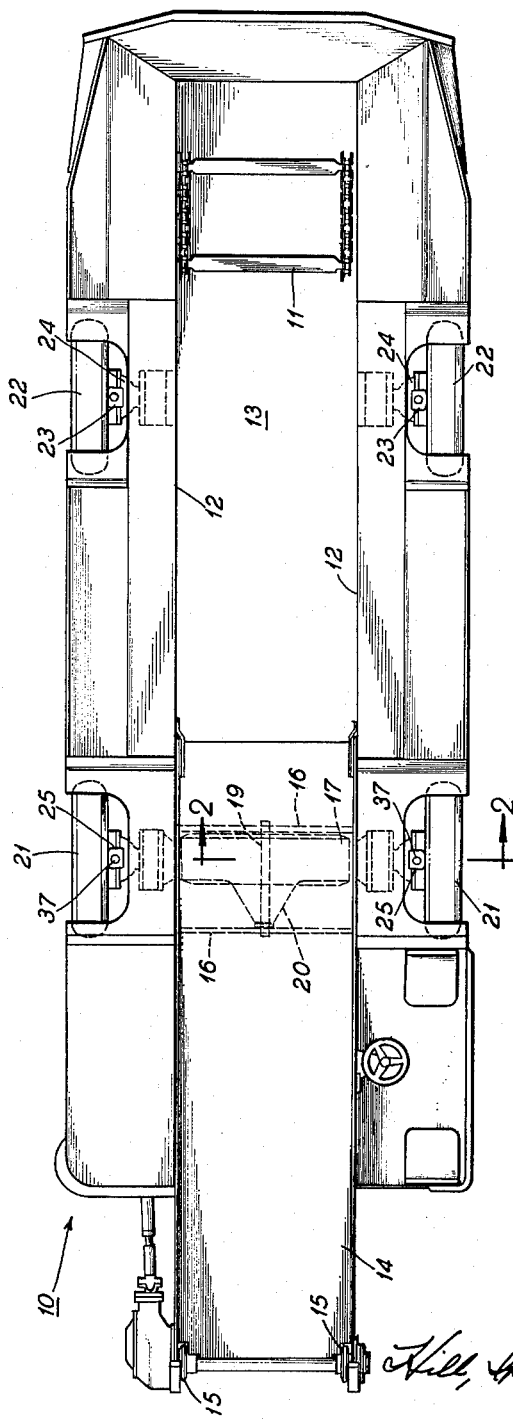
FIGURE 1 is a top plan view of a shuttle car of a type in which the wheel mounting brackets are mounted in accordance with the principles of the invention.
Figure 2:
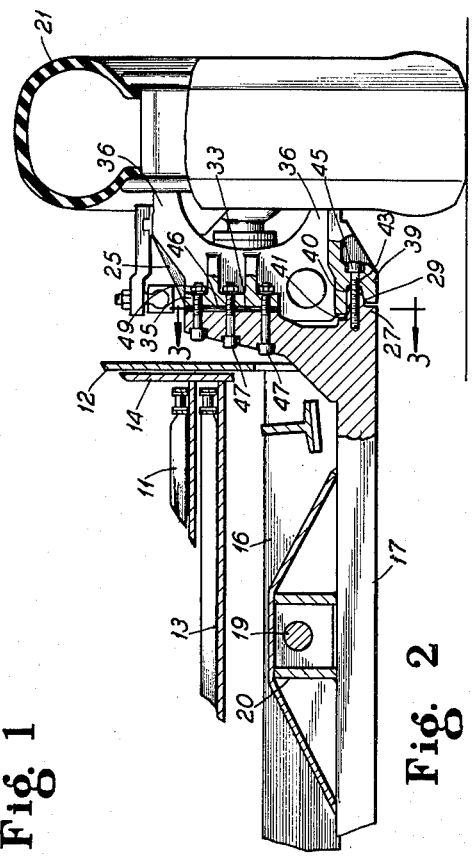
FIGURE 2 is an enlarged fragmentary sectional view taken substantially along line 2—2 of FIGURE 1.

In the embodiment of the invention illustrated in the drawings, we have shown in FIGURES 1 and 2 a mine vehicle 10 of the type known as a shuttle car. The shuttle car 10 has a conveyor 11 extending for substantially the length thereof between side walls 12 of the vehicle.

The conveyor 11 is herein shown as being a well known form of chain and flight type of conveyor carrying material along a bottom plate 13 and upwardly along an elevating portion 14 of the conveyor and turning about drive sprockets 15 at the discharge end of the elevating portion of the conveyor.

The vehicle also has a transverse frame structure including spaced transversely extending brace members 16 having a transverse axle 17 extending therebetween, beyond opposite ends thereof. The axle 17 is transversely pivoted to the brace members 16 on a pivot pin 19, mounted at its ends in said brace members and pivotally mounted on a support structure 20 extending transversely of the axle 17 and upwardly therefrom, and thereby forming a pivotal support for the vehicle frame on the axle 17. The axle 17 has front steering and drive wheels 21 mounted on opposite ends thereof on wheel mounting brackets 25.

Rear steering and drive wheels 22 support the rear end portion of the machine on spindles 23 mounted on wheel mounting brackets 24. The wheel mounting brackets 24 may be mounted on the frame structure of the vehicle or on the side walls thereof, in a manner similar to which the wheel mounting brackets 25 mount the front wheels 21 on opposite ends of the axle 17.

The means for driving the wheels 21 and 22 and for turning said wheels for steering, may be of any well known form and are no part of the present invention, so need not herein be shown or described.

Figure 3:
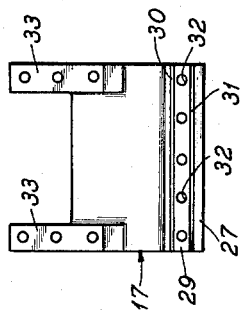
FIGURE 3 is a detail end view of one of the support members for a wheel mounting bracket, taken substantially along line 3—3 of FIGURE 2.

The mountings for the wheel mounting brackets 24 and 25 are the same for all four wheels, so the mounting for one wheel mounting bracket member 25 need only herein be shown and described in detail. As shown in FIGURES 2 and 3, the axle 17 has relatively wide vertically extending support members 27 at opposite ends thereof. Spaced above the tongue 29 and extending upwardly therefrom at opposite ends thereof, are two laterally spaced bearing pads 33 adapted to face similar bearing pads 35 extending vertically along the wheel mounting bracket 25.

The wheel mounting bracket 25 has a bifurcated outer end portion 36, forming mountings for steering spindles 37, at the outer ends thereof, supporting an associated wheel 21 for steering. The wheel mounting bracket 25 also has a lower inner end portion 39 extending for the length of the tongue 29 and having a groove 40 extending for the length thereof. The groove 40 has a generally horizontal flat upper face 41 and a tapered lower face 43 conforming to the upper and lower faces 30 and 31 respectively, of the tongue 29. The lower end portion 39 of the wheel mounting bracket 25 is drilled at spaced apart points to register with the threaded holes 32 leading through the tongue 29 to accommodate cap or machine screws 45 to pass therethrough and be threaded within the threaded holes 32 to move the groove 40 inwardly along the tongue 39, the tapered faces 31 and 43 of the respective tongue and groove taking up clearance between the support member 27 and the wheel mounting bracket 25 as the machine screws 45 are tightened, to clamp the wheel mounting bracket 25 to the tongue 29 along the groove 40, and to positively support the wheel mounting bracket member 25 on the tongue 29, and relieve the machine screws 45 from shearing stresses.

When the machine screws 45 are tightened to their full extent, there will be a space between the bearing pads 33 and 35. The spaces between the bearing pads 33 and 35 may be filled with shims 46 and the bearing pads 33 and 35 may be clamped into engagement with said shims by through bolts 47 extending through said bearing pads and having nuts 49 threaded on the outer ends thereof.

It may be seen from the foregoing that a simple mounting for the wheel mounting brackets for shuttle cars and the like has been provided, which takes all of the bolts connecting the mounting bracket to its support out of shear, and instead supports the mounting bracket on an elongated tongue, clearance between the support and wheel mounting bracket and between said tongue and groove connection, being taken up by mating tapered surfaces of the tongue and groove.

While we have herein shown and described one form in which our invention may be embodied, it will be understood that various variations and modifications in the invention may be attained without departing from the spirit and scope of the novel concepts thereof, as defined by the claims appended hereto.

We claim as our invention:
1. In a wheel support mounting for shuttle cars and the like, a support member, a wheel mounting bracket member, a tongue extending horizontally along one of said members adjacent the lower end thereof, said tongue having a horizontal upper face and a tapered lower face, a mating groove extending along the other of said members adjacent the lower end thereof and having opposite horizontal and tapered faces corresponding to the horizontal and tapered faces of said tongue, fastening means in alignment with said tongue and groove for drawing said members together along said tongue and groove and taking up clearance therebetween, spaced facing vertical bearing pads on said support member and said mounting bracket member spaced above said tongue and groove and normally spaced apart upon the taking of clearance between said tongue and groove, shim means filling the spaces between said bearing pads, and through bolts extending through said bearing pads perpendicular thereto and maintaining said bearing pads in engagement with said shim means under tension.

2. In a spindle mounting for the wheels of shuttle cars and the like, a transverse axle, said axle having elongated vertically extending support members at each end thereof, each support member having an elongated tongue projecting therefrom adjacent the lower end thereof and extending therealong, and having at least one vertically extending bearing pad spaced above said tongue and extending upwardly with respect thereto, said tongue having a horizontal top surface and a tapered bottom surface, a wheel mounting bracket for mounting on each support member, each wheel mounting bracket having a bifurcated outer end portion forming a mounting for the spindles of a steering and drive wheel, and having a lower inner face having a groove extending therealong having a horizontal upper face and a tapered lower face corresponding to the horizontal and tapered faces of said tongue and having a vertically spaced bearing pad facing said bearing pad on said support member, means drawing said spindle mounting bracket member along said tongue and taking up clearance between said tongue and groove, and retaining said groove to said tongue, shim means filling the space between said bearing pads, and through bolts under tension maintaining said bearing pads in engagement with said shim means.

3. In a wheel support mounting for shuttle cars and the like, a support member, a wheel mounting bracket member, a tongue extending horizontally along one of said members adjacent the lower end thereof, said tongue having a horizontal upper face, a tapered lower face and an outer end face perpendicular to said horizontal face, a mating groove extending along the other of said members adjacent the lower end thereof and having opposite horizontal and tapered faces corresponding to the horizontal and tapered faces of said tongue, and an inner end face perpendicular to said horizontal face of said groove, fastening means extending through said tongue and groove perpendicular to the adjacent outer and inner end faces of said tongue and groove for drawing said members together along said tongue and groove and taking up clearance therebetween, said support member and said bracket member having facing bearing pads spaced above said tongue and groove, and through bolts extending through said bearing pads perpendicular to the adjacent faces thereof for drawing said bearing pads together and counteracting the tendency for said mounting bracket to tilt about said tongue and groove.

4. In a wheel support mounting for shuttle cars and the like, a support member having a vertical face, a wheel mounting bracket member having a vertical face, a tongue extending horizontally along and projecting from one of said members adjacent the lower end thereof, a mating groove extending horizontally along the other of said members adjacent the lower end thereof, fastening means extending perpendicular to the adjacent vertical faces of said members through said tongue and groove for drawing said members together along said tongue and groove and taking up clearance therebetween, said support member and said bracket member having facing bearing pads spaced above said tongue and groove and normally spaced apart when clearance is taken up along said tongue and groove, shim means filling the space between said bearing pads, and other fastening means extending through said bearing pads adjacent the upper ends thereof and perpendicular to the facing surfaces of said bearing pads, for retaining said bearing pads to said shim means and counteracting the tendency of said mounting bracket to tilt about said tongue and groove.

References Cited in the file of this patent

UNITED STATES PATENTS

| | | |
|---|---|---|
| 528,251 | Grenier | Oct. 30, 1894 |
| 769,762 | McClellon | Sept. 13, 1904 |
| 910,510 | Davis | Jan. 26, 1909 |
| 2,392,835 | Conlon | Jan. 15, 1946 |

FOREIGN PATENTS

| | | |
|---|---|---|
| 509,895 | France | Aug. 27, 1920 |